US012273048B2

(12) United States Patent
Chen et al.

(10) Patent No.: US 12,273,048 B2
(45) Date of Patent: Apr. 8, 2025

(54) INVERTER CIRCUIT CONTROL METHOD AND RELATED APPARATUS

(71) Applicant: HUAWEI DIGITAL POWER TECHNOLOGIES CO., LTD., Shenzhen (CN)

(72) Inventors: Dong Chen, Shanghai (CN); Yanzhong Zhang, Shenzhen (CN); Lei Shi, Shanghai (CN)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 476 days.

(21) Appl. No.: 17/854,424

(22) Filed: Jun. 30, 2022

(65) Prior Publication Data
US 2022/0337176 A1 Oct. 20, 2022

Related U.S. Application Data

(63) Continuation of application No. PCT/CN2020/108854, filed on Aug. 13, 2020.

(30) Foreign Application Priority Data

Dec. 31, 2019 (CN) .......................... 201911423405.5

(51) Int. Cl.
*H02M 7/538* (2007.01)
*H02M 1/00* (2006.01)
(Continued)

(52) U.S. Cl.
CPC ..... *H02M 7/53871* (2013.01); *H02M 1/0009* (2021.05); *H02M 1/08* (2013.01); *H02M 7/483* (2013.01)

(58) Field of Classification Search
CPC .. H02M 7/53871; H02M 1/0009; H02M 1/08; H02M 7/483
See application file for complete search history.

(56) References Cited

U.S. PATENT DOCUMENTS

2013/0051105 A1* 2/2013 Wang ...................... H02M 1/42
363/132
2013/0229836 A1* 9/2013 Wang .................. H02M 7/4837
363/40
(Continued)

FOREIGN PATENT DOCUMENTS

CN 103081333 A 5/2013
CN 103166234 B 4/2014
(Continued)

OTHER PUBLICATIONS

Pan Jingyuan et al., "Grid Connection Control Strategy Based on the Three level NPC Inverter", Converter Techniques, vol. 40, No. 4, with an English abstract, total 4 pages.
(Continued)

*Primary Examiner* — Rafael O De Leon Domenech

(57) ABSTRACT

Embodiments of this application disclose an inverter apparatus and an inverter apparatus control method. The inverter apparatus includes an inverter circuit and a control unit, and the control unit detects a driving mode of the inverter circuit based on a running state of the inverter circuit. When the inverter circuit outputs reactive power and an output current amplitude is greater than a current threshold, the control unit controls the inverter circuit in a full-bridge two-level bipolar control mode; and in other cases, the control unit controls the inverter circuit in a three-level control mode. This reduces a risk of breaking down horizontal bridge semiconductor switching devices by a voltage spike in an active turn-off process.

19 Claims, 9 Drawing Sheets

(51) Int. Cl.
*H02M 1/08* (2006.01)
*H02M 7/483* (2007.01)
*H02M 7/5387* (2007.01)

(56) References Cited

U.S. PATENT DOCUMENTS

| | | | | |
|---|---|---|---|---|
| 2013/0229838 | A1* | 9/2013 | Wang | H02M 7/493 |
| | | | | 363/40 |
| 2014/0247634 | A1* | 9/2014 | Takizawa | H02P 29/027 |
| | | | | 363/132 |
| 2016/0218557 | A1* | 7/2016 | Cinti | H02M 1/32 |
| 2018/0062537 | A1 | 3/2018 | Wang et al. | |
| 2021/0359593 | A1* | 11/2021 | Tsuruma | H02M 7/53871 |

FOREIGN PATENT DOCUMENTS

| | | |
|---|---|---|
| CN | 102790399 B | 9/2015 |
| CN | 205725511 U | 11/2016 |
| CN | 107466434 A | 12/2017 |
| CN | 107517019 A | 12/2017 |
| CN | 107888100 A | 4/2018 |
| CN | 110247571 A | 9/2019 |
| CN | 111130369 A | 5/2020 |
| EP | 2654191 A2 | 10/2013 |
| EP | 2731222 B1 | 7/2016 |
| JP | 2009095075 A | 4/2009 |
| JP | 5678237 B2 | 2/2015 |
| WO | 2014015666 A1 | 1/2014 |

OTHER PUBLICATIONS

Narendrababu A et al., "A Modified T-type Single Phase Five-Level Inverter with Reduced Switch Voltage Stress", 2018 IEEE, Total 5 Pages.
Chinese Office Action for Application No. 201911423405 dated Sep. 2, 2020, 6 pages.
Extended European Search Report for Application No. 20910243 dated Dec. 21, 2022, 8 pages.
PCT International Search Report for Application No. PCT/CN2020/108854 dated Aug. 13, 2020, 10 pages.

* cited by examiner

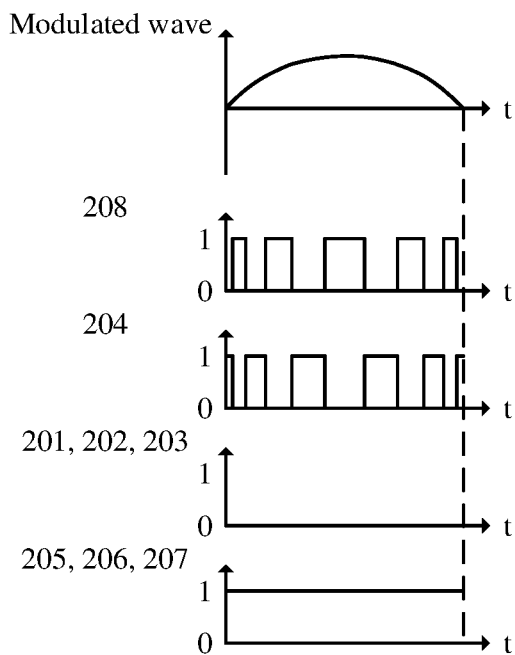
FIG. 11.1
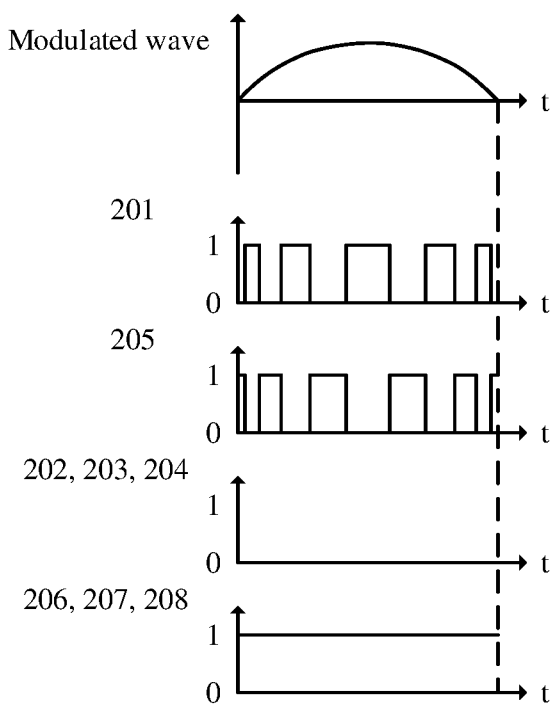
FIG. 11.2

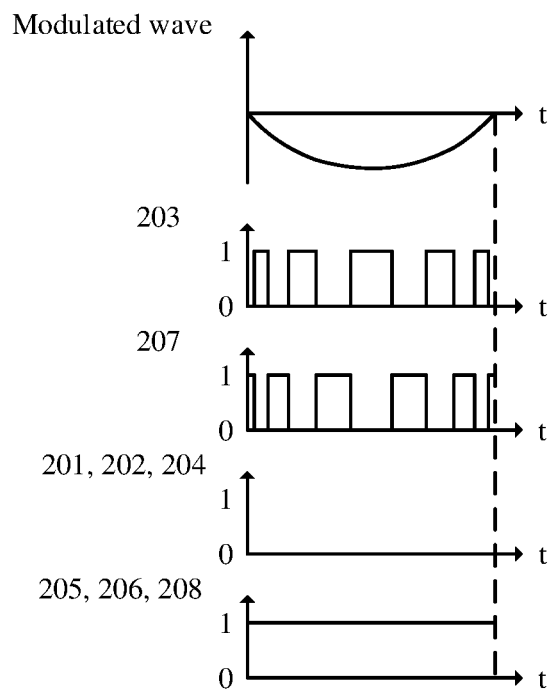
FIG. 11.3
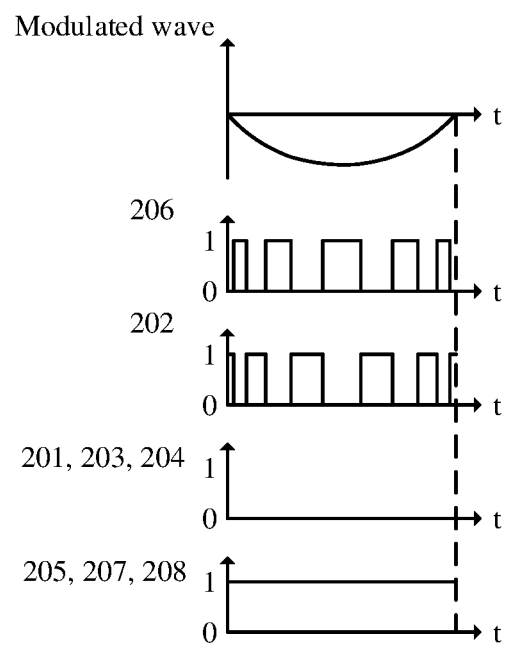
FIG. 11.4

INVERTER CIRCUIT CONTROL METHOD AND RELATED APPARATUS

CROSS-REFERENCE TO RELATED APPLICATIONS

This application is a continuation of International Application No. PCT/CN2020/108854, filed on Aug. 13, 2020, which claims priority to Chinese Patent Application No. 201911423405.5, filed on Dec. 31, 2019. The disclosures of the aforementioned applications are hereby incorporated by reference in their entireties.

TECHNICAL FIELD

Embodiments of this application relate to the field of electricity, and in particular, to an inverter circuit control method and a related apparatus.

BACKGROUND

Inverter circuits are widely used. In exiting power sources, a storage battery, a solar cell, and the like are all direct current power sources. When these power sources supply power to an alternating current load, an inverter circuit needs to be used. In addition, power electronic devices such as a frequency converter used by an alternating current motor for speed adjustment, an uninterruptible power supply, and an induction heating power supply are widely used, and a core part of a circuit of the power electronic device is an inverter circuit.

The inverter circuit is configured to implement conversion between a direct current voltage and an alternating current voltage, and implements conversion from a direct current voltage into an alternating current voltage by driving a semiconductor switching device to be turned on or off. A single-phase three-level inverter circuit is a common inverter circuit.

When the semiconductor switching device performs an active turn-off action, a voltage spike occurs in a turn-off process of the semiconductor switching device, and a voltage stress of the voltage spike is positively correlated with a current flowing through the semiconductor switching device in the turn-off process. In other words, a higher current flowing through the semiconductor switching device leads to a larger voltage stress. Consequently, when the semiconductor switching device performs the turn-off action and the current is high in the turn-off process, the semiconductor switching device may be broken down by the voltage spike.

SUMMARY

This application provides an inverter apparatus and an inverter circuit control method. When an inverter circuit outputs reactive power and an output current is greater than a current threshold, the inverter circuit uses a full-bridge two-level bipolar control mode, and horizontal bridge semiconductor switching devices do not perform an active turn-off action.

According to a first aspect of this application, an inverter apparatus is provided. The inverter apparatus includes an inverter circuit and a control unit. The inverter circuit is configured to convert a direct current into two or more levels. For example, the inverter circuit converts the direct current into two levels when the inverter circuit uses a full-bridge two-level bipolar control mode, or the inverter circuit converts the direct current into three levels when the inverter circuit uses a three-level control mode. The control unit is configured to obtain an output voltage and an output current of the inverter circuit, where the output voltage includes an output voltage direction and an output voltage amplitude, and the output current includes an output current direction and an output current amplitude. The inverter circuit outputs active power when the output voltage direction is the same as the output current direction, or the inverter circuit outputs reactive power when the output voltage direction is opposite to the output current direction. The control unit detects an inverter circuit control mode based on the obtained information. When the inverter circuit outputs reactive power and the output current amplitude is greater than a current threshold, the control unit controls the inverter circuit in the full-bridge two-level bipolar control mode; or when the inverter circuit outputs active power, or when the inverter circuit outputs reactive power and the output current amplitude is not greater than a current threshold, the control unit controls the inverter circuit in the three-level control mode.

When the inverter circuit outputs reactive power and the output current is greater than the current threshold, the inverter circuit uses the full-bridge two-level bipolar control mode. In this case, horizontal bridge semiconductor switching devices do not perform an active turn-off action. This reduces a risk of breaking down the horizontal bridge semiconductor switching devices by a voltage spike in an active turn-off process.

According to the first aspect, in a first possible implementation of the first aspect, the inverter circuit includes two vertical bridge arms, namely, a first vertical bridge arm and a second vertical bridge arm, and two horizontal bridge arms, namely, a first horizontal bridge arm and a second horizontal bridge arm. The first vertical bridge arm includes a first switching element and a second switching element, a first end of the first switching element is connected to a positive terminal of a first direct current voltage source, a second end of the first switching element is connected to a first output terminal of the inverter circuit, a first end of the second switching element is connected to the first output terminal of the inverter circuit, and a second end of the second switching element is connected to a negative terminal of a second direct current voltage source. The second vertical bridge arm includes a third switching element and a fourth switching element, a first end of the third switching element is connected to the positive terminal of the first direct current voltage source, a second end of the third switching element is connected to a second output terminal of the inverter circuit, a first end of the fourth switching element is connected to the second output terminal of the inverter circuit, and a second end of the fourth switching element is connected to the negative terminal of the second direct current voltage source. A negative terminal of the first direct current voltage source is connected to a voltage reference point, and a positive terminal of the second direct current voltage source is connected to the voltage reference point. The first horizontal bridge arm includes a fifth switching element and a sixth switching element, a first end of the fifth switching element is connected to the first output terminal of the inverter circuit, a first end of the sixth switching element is connected to the voltage reference point, and a second end of the fifth switching element is connected to a second end of the sixth switching element. The second horizontal bridge arm includes a seventh switching element and an eighth switching element, a first end of the seventh switching element is connected to the second output terminal of the inverter circuit, a first end of the eighth switching element is connected to the voltage reference point, and a second end of the seventh switching element is connected to a second end of the eighth switching element.

This application provides a specific implementable inverter circuit, to improve implementability of this solution.

According to the first aspect or the first possible implementation of the first aspect, in a second possible implementation of the first aspect, according to the inverter circuit provided in the first possible implementation of the first aspect of this application, when the control unit controls the inverter circuit in the full-bridge two-level bipolar control mode, the control unit controls the inverter circuit to drive the first switching element to the fourth switching element, and not to drive the fifth switching element to the eighth switching element. In other words, the inverter circuit drives the first switching element to the fourth switching element according to a specific rule, and keeps the fifth switching element to the eighth switching element open.

According to any one of the first aspect or the first and second possible implementations of the first aspect, in a third possible implementation of the first aspect, the first switching element to the eighth switching element may include semiconductor devices.

According to any one of the first aspect or the first to the third possible implementations of the first aspect, in a fourth possible implementation of the first aspect, any one of the fifth switching element to the eighth switching element may include two or more semiconductor switching devices. For example, the fifth switching element includes two semiconductor switching devices, namely, a first semiconductor device and a second semiconductor device.

According to any one of the first aspect or the first to the fourth possible implementations of the first aspect, in a fifth possible implementation of the first aspect, this application provides another inverter circuit. The inverter circuit includes two vertical bridge arm, namely, a first vertical bridge arm and a second vertical bridge arm, and one horizontal bridge arm. The first vertical bridge arm includes a first switching element and a second switching element, a first end of the first switching element is connected to a positive terminal of a direct current voltage source, a second end of the first switching element is connected to a first output terminal of the inverter circuit, a first end of the second switching element is connected to the first output terminal of the inverter circuit, and a second end of the second switching element is connected to a negative terminal of the direct current voltage source. The second vertical bridge arm includes a third switching element and a fourth switching element, a first end of the third switching element is connected to the positive terminal of the direct current voltage source, a second end of the third switching element is connected to a second output terminal of the inverter circuit, a first end of the fourth switching element is connected to the second output terminal of the inverter circuit, and a second end of the fourth switching element is connected to the negative terminal of the direct current voltage source. The first horizontal bridge arm includes a fifth switching element and a sixth switching element, a first end of the fifth switching element is connected to the first output terminal of the inverter circuit, a first end of the sixth switching element is connected to the second output terminal of the inverter circuit, and a second end of the fifth switching element is connected to a second end of the sixth switching element.

This application provides another implementable inverter circuit, to improve flexibility of this solution.

According to any one of the first aspect or the first to the fifth possible implementations of the first aspect, in a sixth possible implementation of the first aspect, according to the inverter circuit provided in the fifth implementation of the first aspect of this application, when the control unit controls the inverter circuit in the full-bridge two-level bipolar control mode, the control unit controls the inverter circuit to drive the first switching element to the fourth switching element, and not to drive the fifth switching element and the sixth switching element. In other words, the inverter circuit drives the first switching element to the fourth switching element according to a specific rule, and keeps the fifth switching element and the sixth switching element open.

According to any one of the first aspect or the first to the sixth possible implementations of the first aspect, in a seventh possible implementation of the first aspect, the first switching element to the sixth switching element may include semiconductor devices.

According to any one of the first aspect or the first to the seventh possible implementations of the first aspect, in an eighth possible implementation of the first aspect, either the fifth switching element or the sixth switching element may include two or more semiconductor switching devices. For example, the fifth switching element includes two semiconductor switching devices, namely, a first semiconductor device and a second semiconductor device.

According to any one of the first aspect or the first and the eighth possible implementations of the first aspect, in a ninth possible implementation of the first aspect, the semiconductor device may include an insulated gate bipolar transistor (IGBT) and an anti-parallel diode of the IGBT, and/or a metal-oxide-semiconductor field-effect transistor (MOSFET).

According to a second aspect of this application, an inverter apparatus is provided. The inverter apparatus includes an inverter circuit and a control unit. The inverter circuit is configured to convert a direct current into two or more levels. For example, the inverter circuit converts the direct current into two levels when the inverter circuit uses a full-bridge two-level bipolar control mode or a half-bridge two-level control mode, or the inverter circuit converts the direct current into three levels when the inverter circuit uses a three-level control mode. The control unit is configured to obtain an output voltage and an output current of the inverter circuit, where the output voltage includes an output voltage direction and an output voltage amplitude, and the output current includes an output current direction and an output current amplitude. The inverter circuit outputs active power when the output voltage direction is the same as the output current direction, or the inverter circuit outputs reactive power when the output voltage direction is opposite to the output current direction. The control unit detects an inverter circuit control mode based on the obtained information. When the inverter circuit outputs reactive power and the output current amplitude is greater than a current threshold, the control unit controls the inverter circuit in the full-bridge two-level bipolar control mode; when the inverter circuit outputs active power and the output voltage amplitude is less than a voltage threshold, or when the inverter circuit outputs reactive power, the output current amplitude is not greater than a current threshold, and the output voltage amplitude is less than a voltage threshold, the control unit controls the inverter circuit in the half-bridge two-level control mode; or when the inverter circuit outputs active power and the output voltage amplitude is not less than a voltage threshold, or when the inverter circuit outputs reactive power, the output current amplitude is not greater than a current threshold, and the output voltage amplitude is not less than a voltage threshold, the control unit controls the inverter circuit in the three-level control mode.

When the inverter circuit outputs reactive power and the output current is greater than the current threshold, the inverter circuit uses the full-bridge two-level bipolar control mode. In this case, horizontal bridge semiconductor switching devices do not perform an active turn-off action. This reduces a risk of breaking down the horizontal bridge semiconductor switching devices by a voltage spike in an active turn-off process. When the output voltage amplitude is less than the voltage threshold, the inverter circuit uses the half-bridge two-level control mode. This can reduce a loss of the switching device and improve efficiency of the inverter circuit. In other cases, the inverter circuit still uses the three-level control mode, to take full advantage of a small filter and a small loss of the three-level circuit.

According to the second aspect, in a first possible implementation of the second aspect, this application provides the inverter circuit, the inverter circuit includes two vertical bridge arms, namely, a first vertical bridge arm and a second vertical bridge arm, and two horizontal bridge arms, namely, a first horizontal bridge arm and a second horizontal bridge arm. The first vertical bridge arm includes a first switching element and a second switching element, a first end of the first switching element is connected to a positive terminal of a first direct current voltage source, a second end of the first switching element is connected to a first output terminal of the inverter circuit, a first end of the second switching element is connected to the first output terminal of the inverter circuit, and a second end of the second switching element is connected to a negative terminal of a second direct current voltage source. The second vertical bridge arm includes a third switching element and a fourth switching element, a first end of the third switching element is connected to the positive terminal of the first direct current voltage source, a second end of the third switching element is connected to a second output terminal of the inverter circuit, a first end of the fourth switching element is connected to the second output terminal of the inverter circuit, and a second end of the fourth switching element is connected to the negative terminal of the second direct current voltage source. A negative terminal of the first direct current voltage source is connected to a voltage reference point, and a positive terminal of the second direct current voltage source is connected to the voltage reference point. The first horizontal bridge arm includes a fifth switching element and a sixth switching element, a first end of the fifth switching element is connected to the first output terminal of the inverter circuit, a first end of the sixth switching element is connected to the voltage reference point, and a second end of the fifth switching element is connected to a second end of the sixth switching element. The second horizontal bridge arm includes a seventh switching element and an eighth switching element, a first end of the seventh switching element is connected to the second output terminal of the inverter circuit, a first end of the eighth switching element is connected to the voltage reference point, and a second end of the seventh switching element is connected to a second end of the eighth switching element.

This application provides a specific implementable inverter circuit, to improve implementability of this solution.

According to the second aspect or the first possible implementation of the second aspect, in a second possible implementation of the second aspect, according to the inverter circuit provided in the first possible implementation of the second aspect of this application, when the control unit controls the inverter circuit in the full-bridge two-level bipolar control mode, the control unit controls the inverter circuit to drive the first switching element to the fourth switching element, and not to drive the fifth switching element to the eighth switching element. In other words, the inverter circuit drives the first switching element to the fourth switching element according to a specific rule, and keeps the fifth switching element to the eighth switching element open.

According to any one of the second aspect or the first to the second possible implementations of the second aspect, in a third possible implementation of the second aspect, according to the inverter circuit provided in the first implementation of the second aspect of this application, when the control unit controls the inverter circuit in the half-bridge two-level control mode, the inverter circuit may use any one of the following driving modes:

(1) The inverter circuit drives the first switching element and the fifth switching element to be closed or open, drives the sixth switching element to the eighth switching element to keep closed, and does not drive the second switching element to the fourth switching element, that is, the second switching element to the fourth switching element keep open.

(2) The inverter circuit drives the fourth switching element and the eighth switching element to be closed or open, drives the fifth switching element to the seventh switching element to keep closed, and does not drive the first switching element to the third switching element, that is, the first switching element to the third switching element keep open.

(3) The inverter circuit drives the third switching element and the seventh switching element to be closed or open, drives the fifth switching element, the sixth switching element, and the eighth switching element to keep closed, and does not drive the first switching element, the second switching element, and the fourth switching element, that is, the first switching element, the second switching element, and the fourth switching element keep open.

(4) The inverter circuit drives the second switching element and the sixth switching element to be closed or open, drives the fifth switching element, the seventh switching element, and the eighth switching element to keep closed, and does not drive the first switching element, the third switching element, and the fourth switching element, that is, the first switching element, the third switching element, and the fourth switching element keep open.

According to any one of the second aspect or the first to the third possible implementations of the second aspect, in a fourth possible implementation of the second aspect, the first switching element to the eighth switching element may include semiconductor devices.

According to any one of the second aspect or the first to the fourth possible implementations of the second aspect, in a fifth possible implementation of the second aspect, any one of the fifth switching element to the eighth switching element may include two or more semiconductor switching devices. For example, the fifth switching element includes two semiconductor switching devices, namely, a first semiconductor device and a second semiconductor device.

According to any one of the second aspect or the first to the fifth possible implementations of the second aspect, in a sixth possible implementation of the second aspect, the semiconductor device may include an insulated gate bipolar transistor (IGBT) and an anti-parallel diode of the IGBT, and/or a metal-oxide-semiconductor field-effect transistor (MOSFET).

A third aspect of this application provides an inverter apparatus control method. The inverter apparatus control method is applied to the inverter apparatus according to the first aspect. The inverter apparatus includes an inverter circuit and a control unit. The inverter circuit is configured to convert a direct current into two or more levels. For example, the inverter circuit converts the direct current into two levels when the inverter circuit uses a full-bridge two-level bipolar control mode, or the inverter circuit converts the direct current into three levels when the inverter circuit uses a three-level control mode. The control unit is configured to obtain an output voltage and an output current of the inverter circuit, where the output voltage includes an output voltage direction and an output voltage amplitude, and the output current includes an output current direction and an output current amplitude. The inverter circuit outputs active power when the output voltage direction is the same as the output current direction, or the inverter circuit outputs reactive power when the output voltage direction is opposite to the output current direction. The control unit detects an inverter circuit control mode based on the obtained information. When the inverter circuit outputs reactive power and the output current amplitude is greater than a current threshold, the control unit controls the inverter circuit in a full-bridge two-level bipolar control mode; or when the inverter circuit outputs active power, or when the inverter circuit outputs reactive power and the output current amplitude is not greater than a current threshold, the control unit controls the inverter circuit in a three-level control mode.

A fourth aspect of this application provides an inverter apparatus control method. The inverter apparatus control method is applied to the inverter apparatus according to the second aspect. The inverter apparatus includes an inverter circuit and a control unit. The inverter circuit is configured to convert a direct current into two or more levels. For example, the inverter circuit converts the direct current into two levels when the inverter circuit uses a full-bridge two-level bipolar control mode or a half-bridge two-level control mode, or the inverter circuit converts the direct current into three levels when the inverter circuit uses a three-level control mode. The control unit is configured to obtain an output voltage and an output current of the inverter circuit, where the output voltage includes an output voltage direction and an output voltage amplitude, and the output current includes an output current direction and an output current amplitude. The inverter circuit outputs active power when the output voltage direction is the same as the output current direction, or the inverter circuit outputs reactive power when the output voltage direction is opposite to the output current direction. The control unit detects an inverter circuit control mode based on the obtained information. When the inverter circuit outputs reactive power and the output current amplitude is greater than a current threshold, the control unit controls the inverter circuit in the full-bridge two-level bipolar control mode; when the inverter circuit outputs active power and the output voltage amplitude is less than a voltage threshold, or when the inverter circuit outputs reactive power, the output current amplitude is not greater than a current threshold, and the output voltage amplitude is less than a voltage threshold, the control unit controls the inverter circuit in the half-bridge two-level control mode; or when the inverter circuit outputs active power and the output voltage amplitude is not less than a voltage threshold, or when the inverter circuit outputs reactive power, the output current amplitude is not greater than a current threshold, and the output voltage amplitude is not less than a voltage threshold, the control unit controls the inverter circuit in the three-level control mode.

A fifth aspect of this application provides a computer storage medium. The computer storage medium stores instructions. When the instructions are executed on a computer, the computer is enabled to perform the method according to the third aspect or the fourth aspect.

A sixth aspect of this application provides a computer program product. When the computer program product is run on a computer, the computer is enabled to perform the method according to the third aspect or the fourth aspect.

BRIEF DESCRIPTION OF DRAWINGS

FIG. 11.1 is another schematic diagram of working states of switching elements according to an embodiment of this application;

FIG. 11.2 is another schematic diagram of working states of switching elements according to an embodiment of this application;

FIG. 11.3 is another schematic diagram of working states of switching elements according to an embodiment of this application;

FIG. 11.4 is another schematic diagram of working states of switching elements according to an embodiment of this application.

DESCRIPTION OF EMBODIMENTS

An embodiment of this application provides an inverter circuit control method. When an inverter circuit outputs reactive power and an output current is greater than a current threshold, the inverter circuit uses a full-bridge two-level bipolar control mode.

The following clearly describes the technical solutions in embodiments of this application with reference to the accompanying drawings in embodiments of this application. It is clear that the described embodiments are merely some but not all embodiments of this application.

In this application, terms such as "first", "second", "third", and "fourth" (if existent) in the specification, the claims, and the accompanying drawings are intended to distinguish between similar objects but do not necessarily indicate a specific order or sequence. It should be understood that the data termed in such a way is interchangeable in proper circumstances, so that embodiments described herein can be implemented in orders other than the order illustrated or described herein. Moreover, the terms "include", "comprise", "contain", and any other variants thereof mean to cover non-exclusive inclusions. For example, a process, method, system, product, or device that includes a list of steps or units is not necessarily limited to those expressly listed steps or units, but may include other steps or units that are not expressly listed or that are inherent to the process, method, product, or device.

An embodiment of this application provides an inverter apparatus. The inverter apparatus includes an inverter circuit and a control unit.

The inverter circuit may be a three-level inverter circuit, for example, a dual T-type single-phase three-level inverter circuit or a Heric single-phase three-level inverter circuit. The specific inverter circuit is not limited herein. A dual T-type single-phase three-level inverter circuit and a Heric single-phase three-level inverter circuit are used as examples for description in this embodiment.

Figure 2:
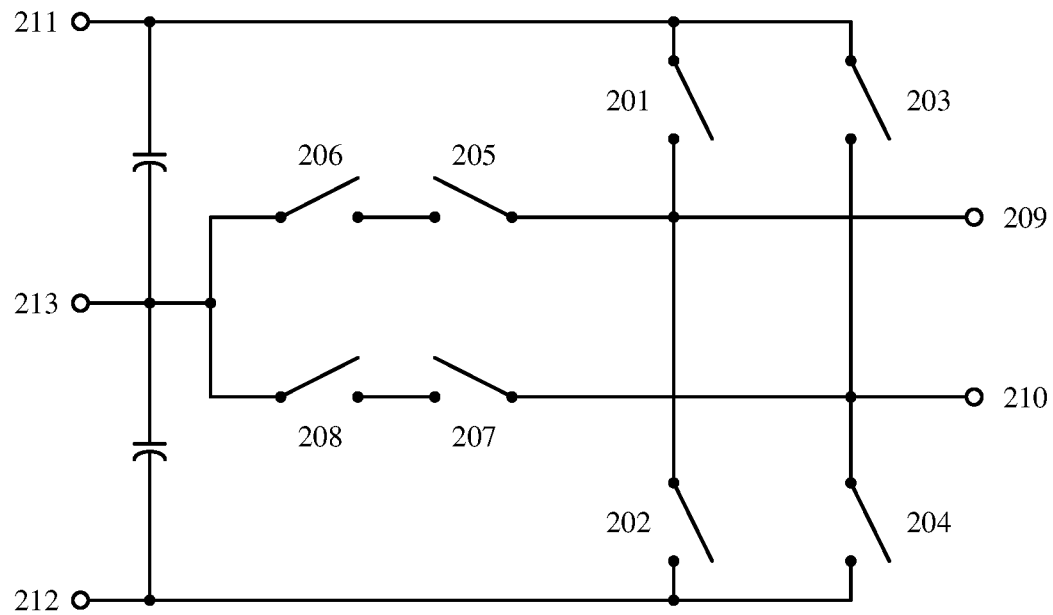
FIG. 2 is a schematic diagram of a dual T-type single-phase three-level inverter circuit according to an embodiment of this application.

FIG. 2 is a schematic diagram of a dual T-type single-phase three-level inverter circuit. The dual T-type single-phase three-level inverter circuit includes two vertical bridge arms and two horizontal bridge arms, and each bridge arm includes two switching elements, that is, the bridge arms include switching elements 201 to 208.

A first vertical bridge arm includes a switching element 201 and a switching element 202 that are connected in series. Two ports obtained after the switching element 201 and the switching element 202 are connected in series are respectively connected to a positive pole 211 of an input terminal and a negative pole 212 of the input terminal, and an intermediate node of the first vertical bridge arm is connected to an output terminal 209.

A second vertical bridge arm includes a switching element 203 and a switching element 204 that are connected in series. Two ports obtained after the switching element 203 and the switching element 204 are connected in series are respectively connected to the positive pole 211 of the input terminal and the negative pole 212 of the input terminal, and an intermediate node of the second vertical bridge arm is connected to an output terminal 210.

A first horizontal bridge arm includes a switching element 205 and a switching element 206 that are connected in series. Two ports obtained after the switching element 205 and the switching element 206 are connected in a reverse direction are respectively connected to a voltage reference point 213 and the output terminal 209.

A second horizontal bridge arm includes a switching element 207 and a switching element 208 that are connected in series. Two ports obtained after the switching element 207 and the switching element 208 are connected in a reverse direction are respectively connected to the voltage reference point 213 and the output terminal 210.

An electrolytic capacitor may be connected between the positive pole 211 of the input terminal and the voltage reference point 213 of the dual T-type single-phase three-level inverter circuit, and an electrolytic capacitor may be connected between the negative pole 212 of the input terminal and the voltage reference point 213 of the dual T-type single-phase three-level inverter circuit. It can be understood that the electrolytic capacitor performs voltage stabilization, provides energy, reduces an area of a switching loop, and the like. In an actual operation, the electrolytic capacitor may be replaced with another component, for example, a film capacitor or a battery. This is not specifically limited herein.

Driving the switching elements 201 to 208 in the bridge arms according to a specific rule can convert a direct current into three levels. The first vertical bridge arm, the first horizontal bridge arm, and the output terminal 209 are used as an example. When the switching element 201 is on, the output terminal 209 is connected to the positive pole 211 of the input terminal, and a positive voltage is output. When the switching element 202 is on, the output terminal 209 is connected to the negative pole 212 of the input terminal, and a negative voltage is output. When the switching elements 205 and 206 are on, the output terminal 209 is connected to the voltage reference point 213, and a zero voltage is output.

Each of the switching elements 201 to 208 may include one semiconductor device and an anti-parallel diode of the semiconductor device. The semiconductor device may include an insulated gate bipolar transistor (IGBT) and/or a metal-oxide-semiconductor field-effect transistor (MOSFET). The specific semiconductor device is not limited herein. In an actual operation, same semiconductor devices may be used in the switching elements 201 to 204 of the circuit, and same semiconductor devices may be used in the switching elements 205 to 208 of the circuit. An example in which IGBTs and anti-parallel diodes of the IGBTs are used in the switching elements 201 to 204 and MOSFETs and diodes are used in the switching elements 205 to 208 is used for description in this embodiment. For details, refer to FIG. 3.

An emitter of an IGBT of a switching element 301 is connected to a collector of an IGBT of a switching element 302, and a collector of the IGBT of the switching element 301 is connected to a positive pole 311 of an input terminal. An emitter of the IGBT of the switching element 302 is connected to a negative pole 312 of the input terminal. An emitter of an IGBT of a switching element 303 is connected to a collector of an IGBT of a switching element 304, and a collector of the IGBT of the switching element 303 is connected to the positive pole 311 of the input terminal. An emitter of the IGBT of the switching element 304 is connected to the negative pole 312 of the input terminal. A source of a MOSFET of a switching element 305 is connected to a source of a MOSFET of a switching element 306. A drain of the MOSFET of the switching element 306 is connected to a voltage reference point 313. A drain of the MOSFET of the switching element 305 is connected to an output terminal 309. A source of a MOSFET of a switching element 307 is connected to a source of a MOSFET of a switching element 308. A drain of the MOSFET of the switching element 308 is connected to the voltage reference point 313. A drain of the MOSFET of the switching element 307 is connected to an output terminal 310.

Figure 4:
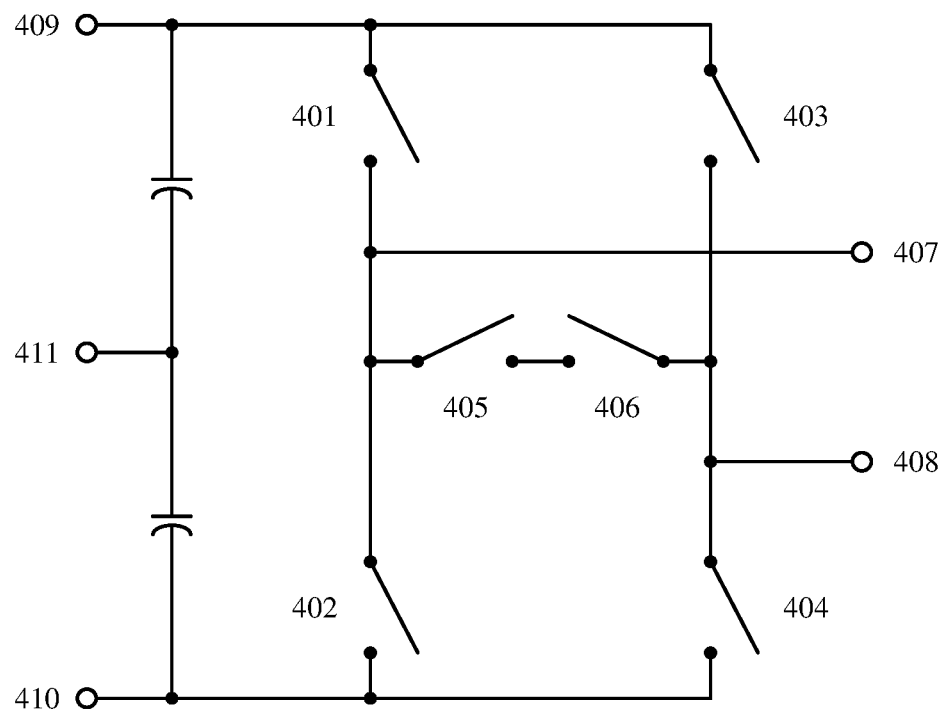
FIG. 4 is a schematic diagram of a Heric single-phase three-level inverter circuit according to an embodiment of this application.

FIG. 4 is a schematic diagram of a Heric single-phase three-level inverter circuit. A dual Heric T-type single-phase three-level inverter circuit includes two vertical bridge arms and one horizontal bridge arm, and each bridge arm includes two switching elements, that is, the bridge arms include switching elements 401 to 406.

A first vertical bridge arm includes a switching element 401 and a switching element 402 that are connected in series. Two ports obtained after the switching element 401 and the switching element 402 are connected in series are respectively connected to a positive pole 409 of an input terminal and a negative pole 410 of the input terminal, and an intermediate node of the first vertical bridge arm is connected to an output terminal 407.

A second vertical bridge arm includes a switching element 403 and a switching element 404 that are connected in series. Two ports obtained after the switching element 403 and the switching element 404 are connected in series are respectively connected to the positive pole 409 of the input terminal and the negative pole 410 of the input terminal, and an intermediate node of the second vertical bridge arm is connected to an output terminal 408.

The horizontal bridge arm includes a switching element 405 and a switching element 406 that are connected in series. Two ports obtained after the switching element 405 and the switching element 406 are connected in a reverse direction are respectively connected to the output terminal 407 and the output terminal 408.

Driving the switching elements 401 to 406 in the bridge arms according to a specific rule can convert a direct current into three levels. The first vertical bridge arm, the horizontal bridge arm, and the output terminal 407 are used as an example. When the switching element 401 is on, the output terminal 407 is connected to the positive pole 409 of the input terminal, and a positive voltage is output. When the switching element 402 is on, the output terminal 407 is connected to the negative pole 410 of the input terminal, and a negative voltage is output. When the switching elements 405 and 406 are on, the output terminal 407 is connected to the output terminal 408, and a zero voltage is approximately output.

An electrolytic capacitor may be connected between the positive pole 409 of the input terminal and a voltage reference point 411 of the Heric single-phase three-level inverter circuit, an electrolytic capacitor may be connected between the negative pole 410 of the input terminal and the voltage reference point 411 of the Heric single-phase three-level inverter circuit, or an electrolytic capacitor may be connected between the positive pole 409 of the input terminal and the negative pole 410 of the input terminal of the Heric single-phase three-level inverter circuit. It can be understood that the electrolytic capacitor performs voltage stabilization, provides energy, reduces an area of a switching loop, and the like. In an actual operation, the electrolytic capacitor may be replaced with another component, for example, a film capacitor or a battery. This is not specifically limited herein.

Figure 5:
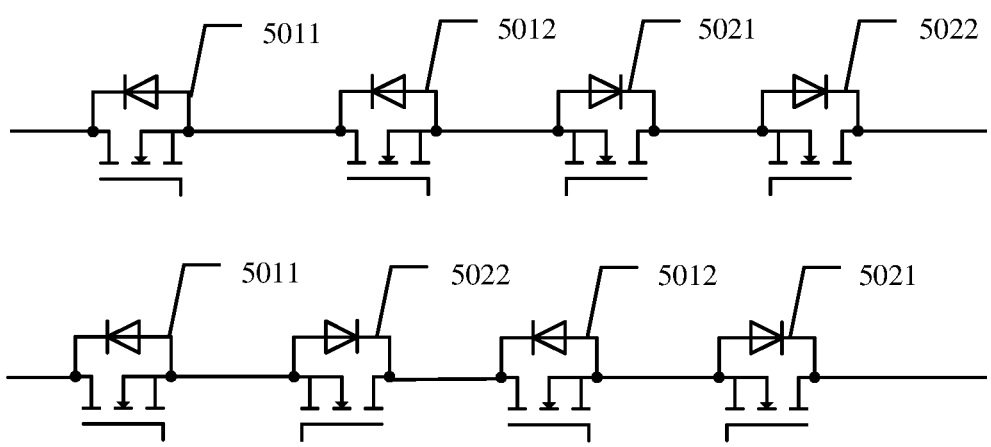
FIG. 5 is a schematic diagram of two connection modes according to an embodiment of this application.

It can be understood that a switching element in this embodiment may include two or more semiconductor devices. The dual T-type single-phase three-level inverter circuit shown in FIG. 2 is used as an example. If the switching element 205 includes m MOSFETs connected in series, and the switching element 206 includes n MOSFETs connected in series, a connection direction of the MOSFETs in the switching element 205 needs to be kept opposite to a connection direction of the MOSFETs in the switching element 206. There may be a plurality of specific modes for connecting the switching elements 205 and 206. m=n=2 is used as an example for description. To be specific, both the switching elements 205 and 206 include two MOSFETs connected in series. FIG. 5 is a schematic diagram of two connection modes. The switching element 205 includes switching sub-elements 5021 and 5022, and the switching element 206 includes switching sub-elements 5011 and 5012.

By replacing a semiconductor switching device with a high voltage withstand level with a plurality of semiconductor switching devices with a low voltage withstand level that are equivalent to the semiconductor switching device with a high voltage withstand level, excellent performance of the semiconductor switching devices with a low voltage withstand level can be utilized to reduce a loss of the inverter circuit.

The control unit may be configured to obtain electrical parameters of the inverter circuit such as an output voltage and an output current. The output voltage may include an output voltage direction and an output voltage amplitude, and the output current may include an output current direction and an output current amplitude. The control unit may be configured to detect output power of the inverter circuit. The output power is active power when the output voltage direction is the same as the output current direction, or the output power is reactive power when the output voltage direction is opposite to the output current direction. The control unit may be further configured to: detect an inverter circuit control mode based on the electrical parameters and the output power of the inverter circuit, and control driving of each switching element of the inverter circuit.

The control unit may be implemented by using a hardware circuit, or may be implemented by using software. When the control unit is implemented by using software, the inverter apparatus includes a processor, and the processor implements a unit (some units) or a module (some modules) by running program instructions.

The processor may be a central processing unit, a general purpose processor, a digital signal processor, an application-specific integrated circuit, a programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination including one or more microprocessors, or a combination of a digital signal processor and a microprocessor. In addition, a memory may include any medium that can store program code, such as a ROM, a random access memory RAM, a magnetic disk, or an optical disc.

Figure 1:
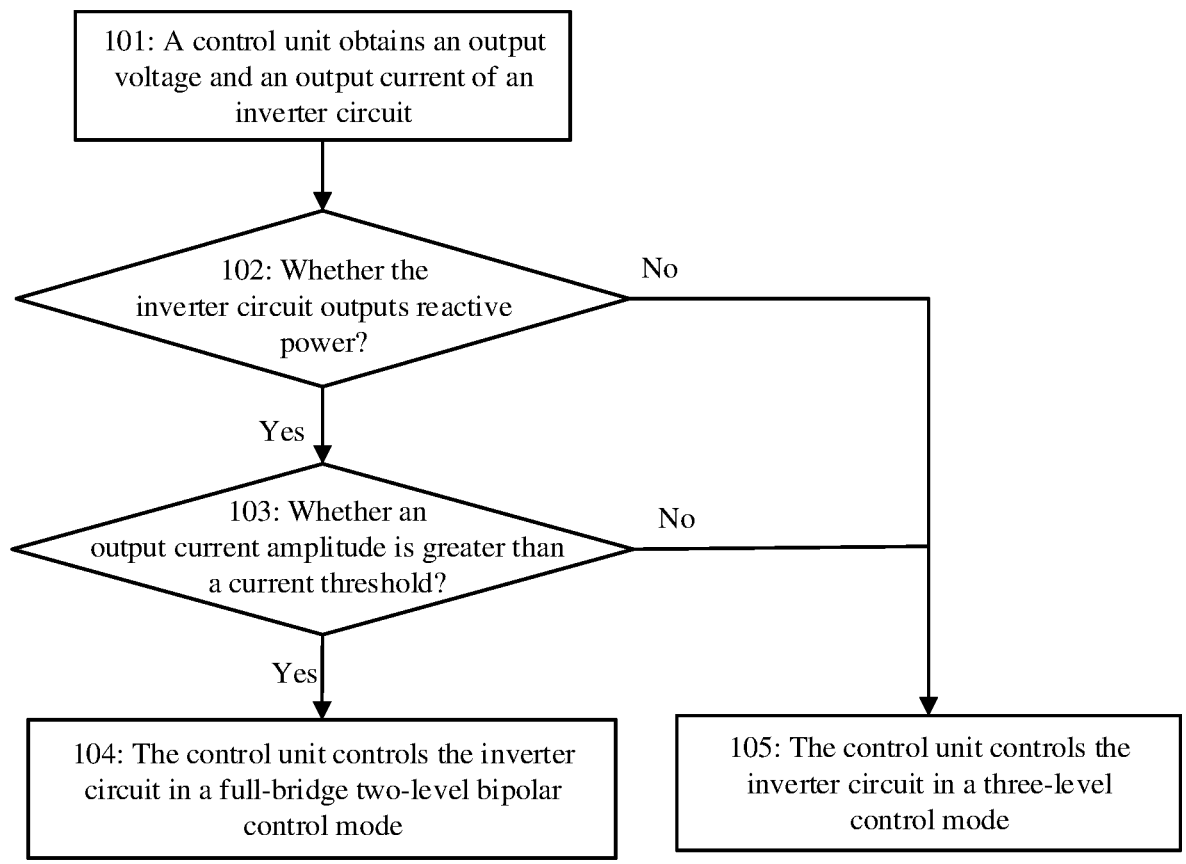
FIG. 1 is a schematic flowchart of a control method according to an embodiment of this application.

With reference to FIG. 1, a possible implementation of an inverter apparatus according to an embodiment of this application is as follows.

101: A control unit obtains an output voltage and an output current of an inverter circuit.

In this embodiment of this application, a voltage direction is a direction of an electric potential difference, namely, a direction from a high electric potential to a low electric potential. The output voltage includes an output voltage direction and an output voltage amplitude, and an output current direction includes the output current direction and an output current amplitude.

102: The control unit detects whether the inverter circuit outputs reactive power, and if the inverter circuit does not output reactive power, performs step 105; or if the inverter circuit outputs reactive power, performs step 103.

The inverter circuit outputs active power when the output voltage direction is the same as the output current direction, or the inverter circuit outputs reactive power when the output voltage direction is opposite to the output current direction.

103: The control unit detects whether the output current amplitude is greater than a current threshold, and if the output current amplitude is not greater than the current threshold, performs step 105; or if the output current amplitude is greater than the current threshold, performs step 104.

A voltage spike occurs in an active turn-off process of a semiconductor switching device, and a voltage stress of the voltage spike is positively correlated with a current flowing through the semiconductor switching device in the turn-off process. In other words, a higher current flowing through the semiconductor switching device leads to a larger voltage stress. The current threshold needs to be not greater than a maximum current amplitude at which an over-rating risk does not occur in the voltage stress of the switching device when the switching device performs an active turn-off action. The current threshold varies according to a characteristic of the switching device, a characteristic of the circuit in which the switching device is located, and the like. A specific value of the current threshold is not limited herein.

In this embodiment, steps 102 and 103 are judgments made in two different dimensions, and there is no time sequence relationship between the two steps. In other words, step 103 may be performed first, and then step 102 is performed. A specific procedure is as follows: The control unit detects whether the output current amplitude is greater than the current threshold, and if the output current amplitude is not greater than the current threshold, the control unit controls the inverter circuit in a three-level control mode; or if the output current amplitude is greater than the current threshold, the control unit detects whether the inverter circuit outputs reactive power. If the inverter circuit does not output reactive power, the control unit controls the inverter circuit in a three-level control mode; or if the inverter circuit outputs reactive power, the control unit controls the inverter circuit in a full-bridge two-level bipolar control mode.

104: The control unit controls the inverter circuit in the full-bridge two-level bipolar control mode.

If the inverter circuit outputs reactive power and the output current amplitude is greater than the current threshold, the control unit detects the inverter circuit in the full-bridge two-level bipolar control mode.

Figure 6:
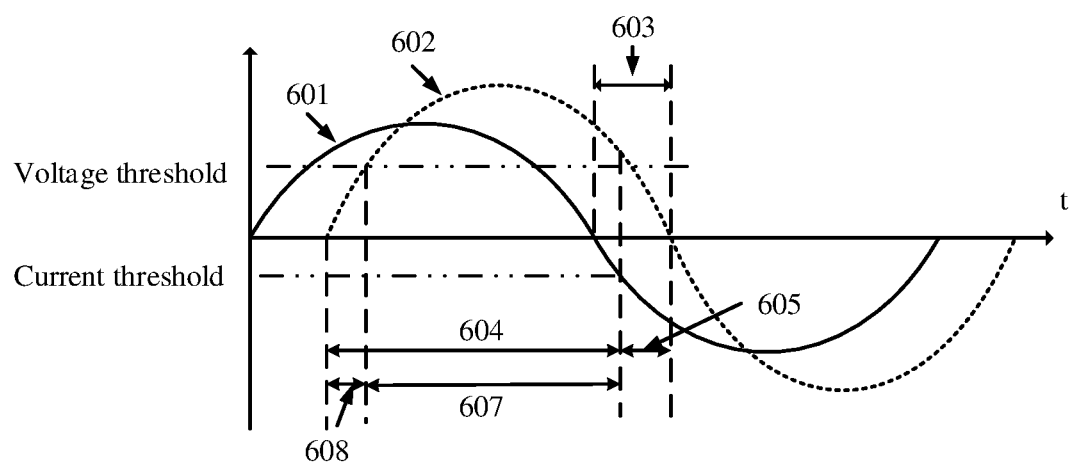
FIG. 6 is a schematic diagram of an output voltage and an output current of an inverter circuit according to an embodiment of this application.

Refer to FIG. 6. If 601 represents a current curve and 602 represents a voltage curve, when the output voltage and the output current of the inverter circuit are in a state 603, the voltage is in a positive direction, the current is in a negative direction, and the voltage direction is opposite to the current direction. The state 603 of the inverter circuit is that reactive power is output. When the inverter circuit is in the state 603 and the output current amplitude is greater than the current threshold, that is, the inverter circuit is in a state 605, the control unit controls the inverter circuit in the full-bridge two-level bipolar control mode.

Figure 7:
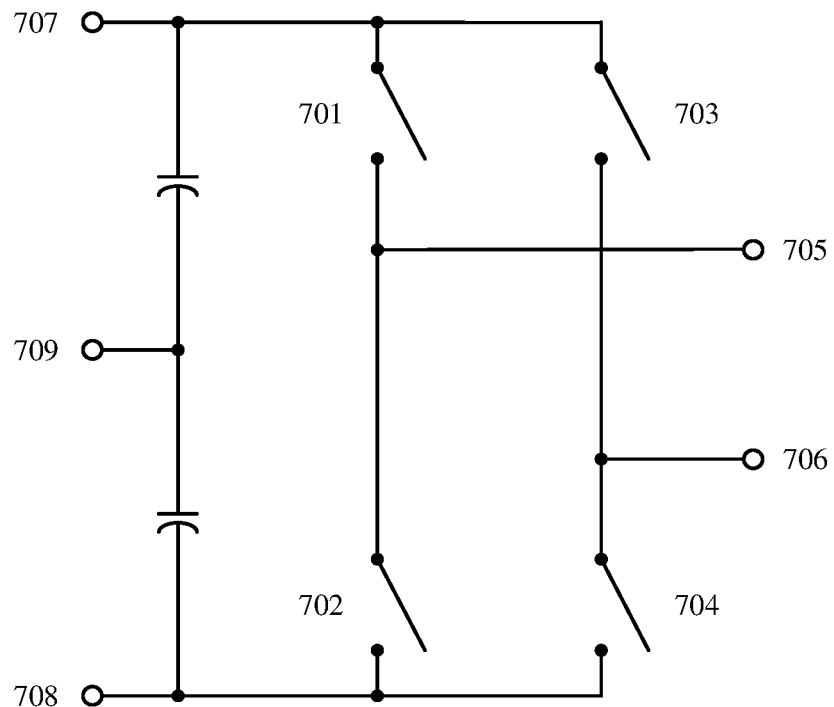
FIG. 7 is a schematic diagram of a full-bridge two-level bipolar circuit according to an embodiment of this application.

When the inverter circuit uses the full-bridge two-level bipolar control mode, an equivalent circuit of the inverter circuit is shown in FIG. 7 and includes two bridge arms, and each bridge arm includes two switching elements, that is, the bridge arms include switching elements 701 to 704.

A first bridge arm includes a switching element 701 and a switching element 702 that are connected in series. Two ports obtained after the switching element 701 and the switching element 702 are connected in series are respectively connected to a positive pole 707 of an input terminal and a negative pole 708 of the input terminal, and an intermediate node of the first bridge arm is connected to an output terminal 705.

A second bridge arm includes a switching element 703 and a switching element 704 that are connected in series. Two ports obtained after the switching element 703 and the switching element 704 are connected in series are respectively connected to the positive pole 707 of the input terminal and the negative pole 708 of the input terminal, and an intermediate node of the second bridge arm is connected to an output terminal 706.

An electrolytic capacitor may be connected between the positive pole 707 of the input terminal and a voltage reference point 709 of the equivalent circuit of the inverter circuit, an electrolytic capacitor may be connected between the negative pole 708 of the input terminal and the voltage reference point 709 of the equivalent circuit, or an electrolytic capacitor may be connected between the positive pole 707 of the input terminal and the negative pole 708 of the input terminal of the equivalent circuit. It can be understood that the electrolytic capacitor performs voltage stabilization, provides energy, reduces an area of a switching loop, and the like. In an actual operation, the electrolytic capacitor may be replaced with another component, for example, a film capacitor or a battery. This is not specifically limited herein.

Driving the switching elements 701 to 704 in the bridge arms according to a specific rule can convert a direct current into two levels. The first bridge arm and the output terminal 705 are used as an example. When the switching element 701 is on, the output terminal 705 is connected to the positive pole 707 of the input terminal, and a positive voltage is output. When the switching element 702 is on, the output terminal 705 is connected to the negative pole 708 of the input terminal, and a negative voltage is output.

Figure 8:
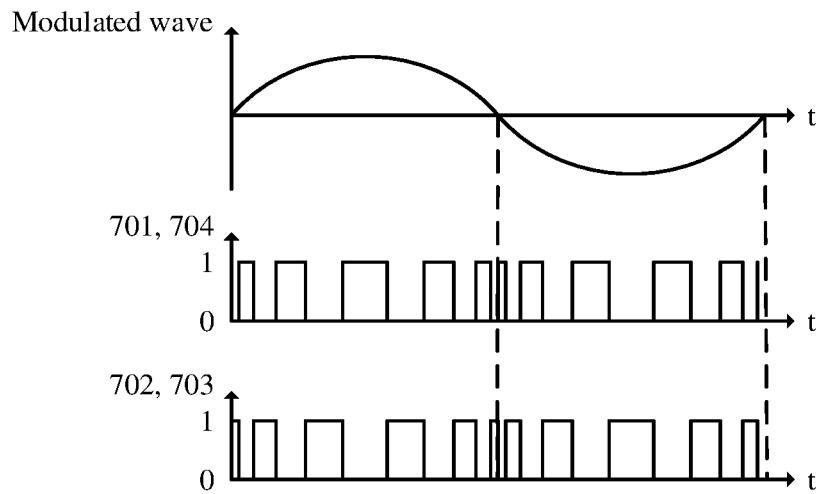
FIG. 8 is a schematic diagram of working states of switching elements according to an embodiment of this application.

With reference to FIG. 8, when the inverter circuit shown in FIG. 7 works in the full-bridge two-level bipolar control mode, driving of the switching element 701 and driving of the switching element 704 are the same, and driving of the switching element 702 and driving of the switching element 703 are the same and are complementary to those of the switching element 701 and the switching element 704. To be specific, the switching element 702 and the switching element 703 are off when the switching element 701 and the switching element 704 are on; or the switching element 702 and the switching element 703 are on when the switching element 701 and the switching element 704 are off.

If the inverter circuit is the dual T-type single-phase three-level inverter circuit shown in FIG. 2, when the control unit controls the inverter circuit in the full-bridge two-level bipolar control mode, the inverter circuit drives the switching elements 201 to 204 but does not drive the switching elements 205 to 208, that is, the inverter circuit drives the switching elements 201 to 204 to perform an on/off action and keeps the switching elements 205 to 208 open. In other words, when the inverter circuit uses the full-bridge two-level bipolar control mode, horizontal bridge semiconductor switching devices (the switching elements 205 to 208) do not perform an active turn-off action. This avoids that a voltage spike occurs in a turn-off process of the horizontal bridge semiconductor switching devices.

In this embodiment, when the inverter circuit uses the full-bridge two-level bipolar control mode, the switching element 201 and the switching element 701 have a same working state, the switching element 202 and the switching element 702 have a same working state, the switching element 203 and the switching element 703 have a same working state, and the switching element 204 and the switching element 704 have a same working state.

If the inverter circuit is the Heric single-phase three-level inverter circuit shown in FIG. 4, when the control unit controls the inverter circuit in the full-bridge two-level bipolar control mode, the inverter circuit drives the switching elements 401 to 404 but does not drive the switching elements 405 and 406, that is, the inverter circuit drives the switching elements 401 to 404 to perform an on/off action and keeps the switching elements 405 and 406 open. In other words, when the inverter circuit uses the full-bridge two-level bipolar control mode, horizontal bridge semiconductor switching devices (the switching elements 405 and 406) do not perform an active turn-off action. This avoids that a voltage spike occurs in a turn-off process of the horizontal bridge semiconductor switching devices.

In this embodiment, when the inverter circuit uses the full-bridge two-level bipolar control mode, the switching element 401 and the switching element 701 have a same working state, the switching element 402 and the switching element 702 have a same working state, the switching element 403 and the switching element 703 have a same working state, and the switching element 404 and the switching element 704 have a same working state.

105: The control unit controls the inverter circuit in the three-level control mode.

If the inverter circuit outputs active power, or if the inverter circuit outputs reactive power and the output current amplitude is not greater than the current threshold, the control unit controls the inverter circuit in the three-level control mode.

Refer to FIG. 6. If 601 represents an alternating current curve and 602 represents an alternating-current voltage curve, when the output voltage and the output current of the inverter circuit are in the state 603, the voltage is in the positive direction, the current is in the negative direction, and the voltage direction is opposite to the current direction. The state 603 of the inverter circuit is that reactive power is output. When the inverter circuit is in the state 603 and the output current amplitude is not greater than the current threshold, or when the inverter circuit outputs active power, that is, the inverter circuit is in a state 604, the control unit controls the inverter circuit in the three-level control mode.

Figure 9:
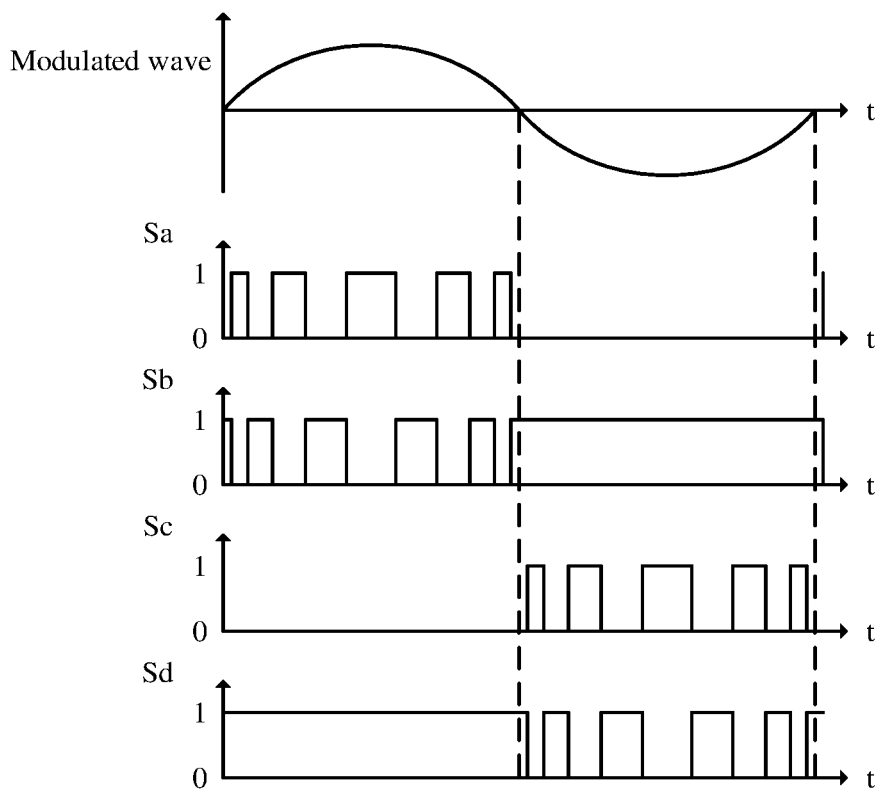
FIG. 9 is another schematic diagram of working states of switching elements according to an embodiment of this application.

FIG. 9 is a schematic diagram of working states of switching elements in one cycle when a modulated wave is a sine wave. Switching elements Sa, Sb, Sc, and Sd are used as an example for description in this embodiment of this application. 1 indicates that a switching element is closed, and 0 indicates that a switching element is open. Driving of the switching element Sa is complementary to that of the switching element Sb. To be specific, the switching element Sb is off when the switching element Sa is on, or the switching element Sb is on when the switching element Sa is off. Driving of the switching element Sc is complementary to that of the switching element Sd. To be specific, the switching element Sd is off when the switching element Sc is on, or the switching element Sd is on when the switching element Sc is off.

In a positive half-cycle of the modulated wave, the switching element Sa and the switching element Sb perform an on/off action, the switching element Sd keeps closed, and the switching remain Sc keeps open. In a negative half-cycle of the modulated wave, the switching element Sc and the switching element Sd perform an on/off action, the switching element Sb keeps closed, and the switching element Sa keeps open.

If the inverter circuit is the dual T-type single-phase three-level inverter circuit shown in FIG. 2, when the inverter circuit uses the three-level control mode, driving of the switching element 201 and the switching element 204 is the same as that of the switching element Sa, driving of the switching element 205 and the switching element 208 is the same as that of the switching element Sb, driving of the switching element 202 and the switching element 203 is the same as that of the switching element Sc, and driving of the switching element 206 and the switching element 207 is the same as that of the switching element Sd.

If the inverter circuit is the Heric single-phase three-level inverter circuit shown in FIG. 4, when the inverter circuit uses the three-level control mode, driving of the switching element 401 and the switching element 404 is the same as that of the switching element Sa, driving of the switching element 405 is the same as that of the switching element Sb, driving of the switching element 402 and the switching element 403 is the same as that of the switching element Sc, and driving of the switching element 406 is the same as that of the switching element Sd.

In this embodiment, when the single-phase three-level inverter circuit outputs reactive power and the output current amplitude is large, switching to the two-level bipolar control mode is performed to stop the on/off action of the horizontal bridge arm switching devices of the inverter circuit. This reduces an over-rating risk that occurs in a voltage stress of the horizontal bridge arm switching devices. In other cases, the inverter circuit still uses the three-level control mode, to take full advantage of a small filter and a small loss of the three-level circuit.

Figure 10:
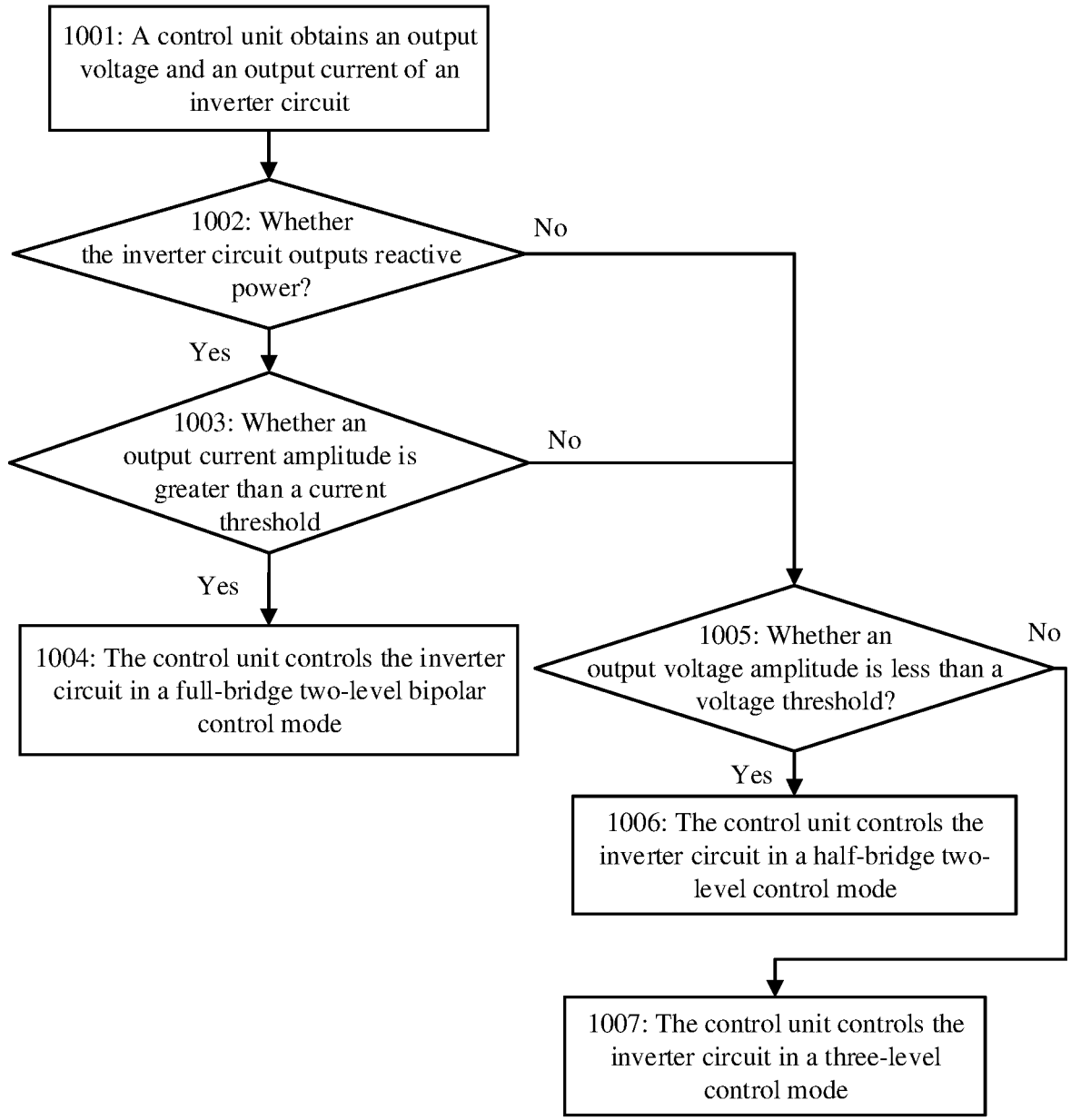
FIG. 10 is another schematic flowchart of a control method according to an embodiment of this application.

With reference to FIG. 10, another possible implementation of an inverter apparatus according to an embodiment of this application is as follows.

1001: A control unit obtains an output voltage and an output current of an inverter circuit.

Figure 3:
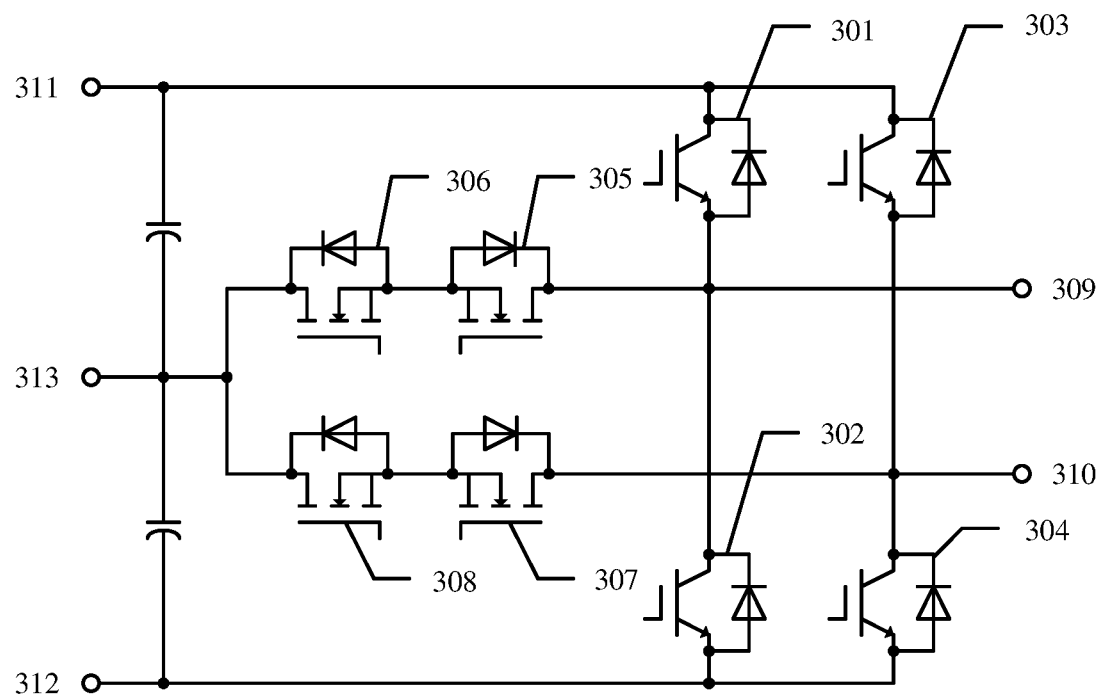
FIG. 3 is another schematic diagram of a dual T-type single-phase three-level inverter circuit according to an embodiment of this application.

This embodiment can be applied to a three-level inverter circuit. A dual T-type single-phase three-level inverter circuit is used as an example in this embodiment. FIG. 2 is a schematic diagram of a dual T-type single-phase three-level inverter circuit. FIG. 3 is a schematic diagram of an implementable dual T-type single-phase three-level inverter circuit. For specific structures and functions of the circuits shown in FIG. 2 and FIG. 3, refer to step 101 in the embodiment corresponding to FIG. 1.

It can be understood that a switching element in this embodiment may include two or more semiconductor devices. The dual T-type single-phase three-level inverter circuit shown in FIG. 2 is used as an example. If the switching element 205 includes m MOSFETs connected in series, and the switching element 206 includes n MOSFETs connected in series, a connection direction of the MOSFETs in the switching element 205 needs to be kept opposite to a connection direction of the MOSFETs in the switching element 206. There may be a plurality of specific modes for connecting the switching elements 205 and 206. m=n=2 is used as an example for description. To be specific, both the switching elements 205 and 206 include two MOSFETs connected in series. FIG. 5 is a schematic diagram of two connection modes. The switching element 205 includes switching sub-elements 5021 and 5022, and the switching element 206 includes switching sub-elements 5011 and 5012.

By replacing a high-voltage semiconductor switching device with a plurality of low-voltage semiconductor switching devices that are equivalent to the high-voltage semiconductor switching device, excellent performance of the low-voltage semiconductors switching devices can be utilized to reduce a loss of the inverter circuit.

1002: The control unit detects whether the inverter circuit outputs reactive power, and if the inverter circuit does not output reactive power, performs step 1005; or if the inverter circuit outputs reactive power, performs step 1003.

1003: The control unit detects whether an output current amplitude is greater than a current threshold, and if the output current amplitude is not greater than the current threshold, performs step 1005; or if the output current amplitude is greater than the current threshold, performs step 1004.

Steps 1002 and 1003 in this embodiment are similar to steps 102 and 103 in the embodiment shown in FIG. 1.

1004: The control unit controls the inverter circuit in a full-bridge two-level bipolar control mode.

If the inverter circuit outputs reactive power and the output current amplitude is greater than the current threshold, the control unit controls the inverter circuit in the full-bridge two-level bipolar control mode.

Refer to FIG. 6. If 601 represents an alternating current curve and 602 represents an alternating-current voltage curve, when the output voltage and the output current of the inverter circuit are in a state 603, the voltage is in a positive direction, the current is in a negative direction, and the voltage direction is opposite to the current direction. The state 603 of the inverter circuit is that reactive power is output. When the inverter circuit is in the state 603 and the output current amplitude is greater than the current threshold, that is, the inverter circuit is in a state 605, the control unit controls the inverter circuit in the full-bridge two-level bipolar control mode.

When the inverter circuit uses the full-bridge two-level bipolar control mode, an equivalent circuit of the inverter circuit is shown in FIG. 7. For the specific structure and function of the circuit shown in FIG. 2, refer to step 102 in the embodiment corresponding to FIG. 1.

If the inverter circuit is the dual T-type single-phase three-level inverter circuit shown in FIG. 2, when the inverter circuit uses the full-bridge two-level bipolar control mode, the inverter circuit drives the switching elements 201 to 204 but does not drive the switching elements 205 to 208, that is, the inverter circuit drives the switching elements 201 to 204 to perform an on/off action and keeps the switching elements 205 to 208 open. In this embodiment, when the inverter circuit uses the full-bridge two-level bipolar control mode, the switching element 201 and the switching element 701 have a same working state, the switching element 202 and the switching element 702 have a same working state, the switching element 203 and the switching element 703 have a same working state, and the switching element 204 and the switching element 704 have a same working state.

1005: The control unit detects whether an output voltage amplitude is less than a voltage threshold, and if the output voltage amplitude is less than the voltage threshold, performs step 1006; or if the output voltage amplitude is not less than the voltage threshold, performs step 1007.

In an actual operation, the voltage threshold is generally not greater than half of an electric potential difference between a positive input terminal and a negative input terminal of the inverter circuit.

In this embodiment, steps 1002, 1003, and 1005 are judgments made in three different dimensions, and there is no time sequence relationship between the three steps.

1006: The control unit controls the inverter circuit in a half-bridge two-level control mode.

If the inverter circuit outputs active power and the output voltage amplitude is less than the voltage threshold, the control unit controls the inverter circuit in the half-bridge two-level control mode. Alternatively, if the inverter circuit outputs reactive power, the output current amplitude is not greater than the current threshold, and the output voltage amplitude is less than the voltage threshold, the control unit controls the inverter circuit in the half-bridge two-level control mode.

Refer to FIG. 6. If 601 represents the alternating current curve and 602 represents the alternating-current voltage curve, when the inverter circuit is in a state 608, the control unit controls the inverter circuit in the half-bridge two-level control mode.

When a modulated wave is a sine wave, FIG. 11.1 is a schematic diagram of working states of switching elements when the modulated wave is in a positive half-cycle and a positive half-bus is used for power supply; FIG. 11.2 is a schematic diagram of working states of switching elements when the modulated wave is in the positive half-cycle and a negative half-bus is used for power supply; FIG. 11.3 is a schematic diagram of working states of switching elements when the modulated wave is in a negative half-cycle and the positive half-bus is used for power supply; and FIG. 11.4 is a schematic diagram of working states of switching elements when the modulated wave is in the negative half-cycle and the negative half-bus is used for power supply.

With reference to FIG. 2, the positive half-bus is a bus between the positive pole 211 of the input terminal and the voltage reference point 213 of the inverter circuit, and the negative half-bus is a bus between the negative pole 212 of the input terminal and the voltage reference point 213 of the inverter circuit.

With reference to FIG. 11.2, when the modulated wave is in the positive half-cycle and the positive half-bus is used for power supply, 1 indicates that a switching element is closed, and 0 indicates that a switching element is open. The switching element 201 and the switching element 205 perform an on/off action, and driving of the switching element 201 is complementary to that of the switching element 205. To be specific, the switching element 205 is off when the switching element 201 is on, or the switching element 205 is on when the switching element 201 is off. The switching elements 202 to 204 keep open and the switching elements 206 to 208 keep closed.

With reference to FIG. 11.1, when the modulated wave is in the positive half-cycle and the negative half-bus is used for power supply, 1 indicates that a switching element is closed, and 0 indicates that a switching element is open. The switching element 204 and the switching element 208 perform an on/off action, and driving of the switching element 204 is complementary to that of the switching element 208. To be specific, the switching element 208 is off when the switching element 204 is on, or the switching element 208 is on when the switching element 204 is off. The switching elements 201 to 203 keep open and the switching elements 205 to 207 keep closed.

With reference to FIG. 11.3, when the modulated wave is in the negative half-cycle and the positive half-bus is used for power supply, 1 indicates that a switching element is closed, and 0 indicates that a switching element is open. The switching element 203 and the switching element 207 perform an on/off action, and driving of the switching element 203 is complementary to that of the switching element 207. To be specific, the switching element 207 is off when the switching element 203 is on, or the switching element 207 is on when the switching element 203 is off. The switching elements 201, 202, and 204 keep open and the switching elements 205, 206, and 208 keep closed.

With reference to FIG. 11.4, when the modulated wave is in the negative half-cycle and the negative half-bus is used for power supply, 1 indicates that a switching element is closed, and 0 indicates that a switching element is open. The switching element 202 and the switching element 206 perform an on/off action, and driving of the switching element 202 is complementary to that of the switching element 206. To be specific, the switching element 206 is off when the switching element 202 is on, or the switching element 206 is on when the switching element 202 is off. The switching elements 201, 203, and 204 keep open and the switching elements 205, 207, and 208 keep closed.

When the inverter circuit uses the half-bridge two-level control mode, generally, in a time period when the half-bridge two-level control mode is used, the positive half-bus is used for power supply for a period of time, and the negative half-bus is used for power supply for a remaining time. The two buses are used in a balanced way. The circuit shown in FIG. 2 is used as an example. If parameters of the switching elements 201 to 204 are the same and parameters of the switching elements 205 to 208 are the same, in the time period when the half-bridge two-level control mode is used, the positive half-bus is used for power supply in half of the duration and the negative half-bus is used for power supply in the other half of the duration, so that energy provided by the positive half-bus is balanced with energy provided by the negative half-bus. This is conducive to reducing current ripples of an electrolytic capacitor, and balances losses of the switching elements, thereby improving heat dissipation efficiency of the switching elements. In this embodiment, in the time period when the half-bridge two-level control mode is used, the duration in which the positive half-bus is used for power supply and the duration in which the negative half-bus is used for power supply are adjusted depending on an actual situation. This is not specifically limited herein.

1007: The control unit controls the inverter circuit in a three-level control mode.

If the inverter circuit outputs active power and the output voltage amplitude is not less than the voltage threshold, the control unit controls the inverter circuit in the three-level control mode. Alternatively, if the inverter circuit outputs reactive power, the output current amplitude is not greater than the current threshold, and the output voltage amplitude is not less than the voltage threshold, the control unit controls the inverter circuit in the three-level control mode.

Refer to FIG. 6. If 601 represents the alternating current curve and 602 represents the alternating-current voltage curve, when the inverter circuit is in a state 607, the control unit controls the inverter circuit in the three-level control mode.

FIG. 9 is a schematic diagram of working states of switching elements in one cycle when a modulated wave is a sine wave. Switching elements Sa, Sb, Sc, and Sd are used as an example for description in this embodiment of this application. 1 indicates that a switching element is closed, and 0 indicates that a switching element is open. Driving of the switching element Sa is complementary to that of the switching element Sb. To be specific, the switching element Sb is off when the switching element Sa is on, or the switching element Sb is on when the switching element Sa is off. Driving of the switching element Sc is complementary to that of the switching element Sd. To be specific, the switching element Sd is off when the switching element Sc is on, or the switching element Sd is on when the switching element Sc is off.

In a positive half-cycle of the modulated wave, the switching element Sa and the switching element Sb perform an on/off action, the switching element Sd keeps closed, and the switching remain Sc keeps open. In a negative half-cycle of the modulated wave, the switching element Sc and the switching element Sd perform an on/off action, the switching element Sb keeps closed, and the switching element Sa keeps open.

If the inverter circuit is the dual T-type single-phase three-level inverter circuit shown in FIG. 2, when the inverter circuit uses the three-level control mode, driving of the switching element 201 and the switching element 204 is the same as that of the switching element Sa, driving of the switching element 205 and the switching element 208 is the same as that of the switching element Sb, driving of the switching element 202 and the switching element 203 is the same as that of the switching element Sc, and driving of the switching element 206 and the switching element 207 is the same as that of the switching element Sd.

In this embodiment, when the single-phase three-level inverter circuit outputs reactive power and the output current amplitude is large, switching to the two-level bipolar control mode is performed to stop the on/off action of the horizontal bridge arm switching devices of the inverter circuit. This reduces an over-rating risk that occurs in a voltage stress of the horizontal bridge arm switching devices. When the output voltage amplitude is less than the voltage threshold, switching to the half-bridge two-level control mode is performed. This can reduce a loss of the switching device and improve efficiency of the inverter circuit. In other cases, the inverter circuit still uses the three-level control mode, to take full advantage of a small filter and a small loss of the three-level circuit.

Figure 12:
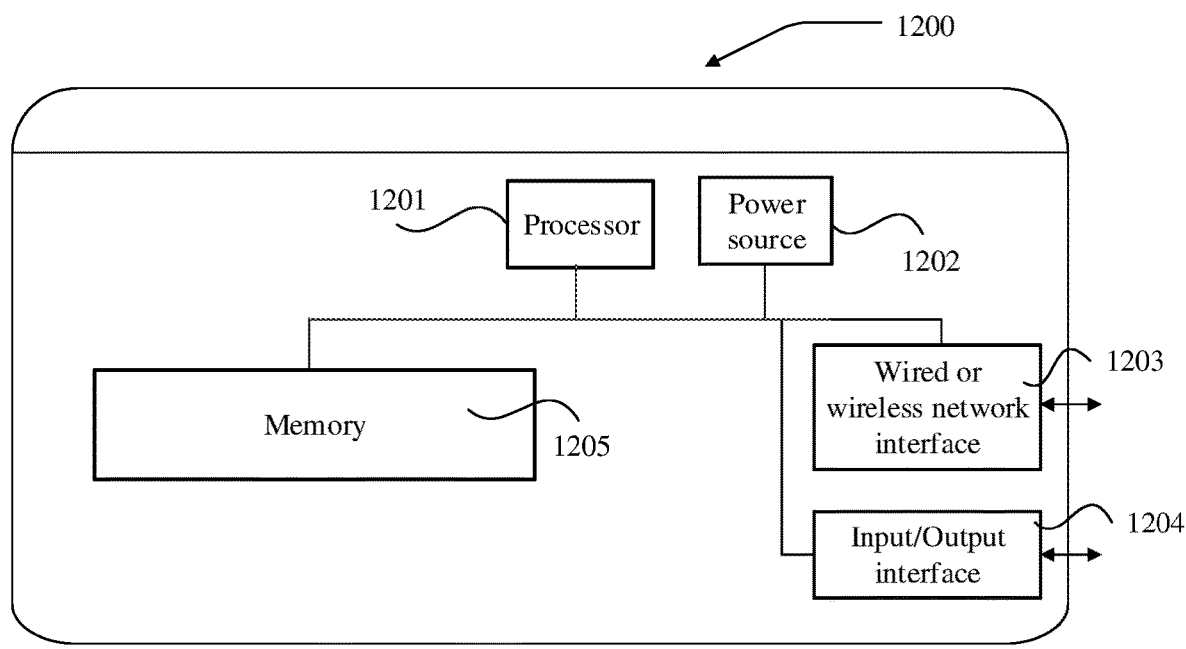
FIG. 12 is a schematic diagram of a structure of an inverter apparatus according to an embodiment of this application.

FIG. 12 is a schematic diagram of a structure of an inverter apparatus according to an embodiment of this application. The inverter apparatus 1200 may include one or more processors 1201 and a memory 1205. The memory 1205 stores one or more application programs or data.

The memory 1205 may be a volatile memory or a persistent memory. The program stored in the memory 1205 may include one or more modules, each of which may include a series of instruction operations for the inverter apparatus. Further, the central processing unit 1201 may be set to communicate with the memory 1205, and perform, on the inverter apparatus 1200, the series of instruction operations in the memory 1205.

The inverter apparatus 1200 may further include one or more power sources 1202, one or more wired or wireless network interfaces 1203, one or more input/output interfaces 1204, and/or one or more operating systems, for example, Windows Server™, Mac OS X™, Unix™, Linux™, or FreeBSD™.

The processor 1201 may perform operations performed by the control unit in the embodiment shown in FIG. 1 or FIG. 10.

This application provides an inverter apparatus. The apparatus may include a control unit and an inverter circuit. The control unit is coupled to the inverter circuit, so that the apparatus implements the method and steps performed by the control unit in the implementation shown in FIG. 1 or FIG. 10. In a possible design, the apparatus is a chip or a system-on-chip.

This application provides a chip system. The chip system includes a processor, configured to support a control unit in implementing functions in the foregoing aspects, for example, obtaining or processing data and/or information in the foregoing methods. In a possible design, the chip system further includes a memory. The memory is configured to store necessary program instructions and data. The chip system may include a chip, or may include a chip and another discrete device.

A person skilled in the art can clearly understand that, for a purpose of convenient and brief description, for detailed working processes of the foregoing system, apparatuses, and units, refer to corresponding processes in the foregoing method embodiments.

In the several embodiments provided in this application, it should be understood that the disclosed system, apparatuses, and methods may be implemented in another manner. For example, the described apparatus embodiments are merely examples. For example, unit division is merely logical function division and may be other division during actual implementation. For example, a plurality of units or components may be combined or may be integrated into another system, or some features may be ignored or not be performed. In addition, the displayed or discussed mutual couplings or direct couplings or communication connections may be implemented through some interfaces. The indirect couplings or communication connections between the apparatuses or the units may be implemented in electrical, mechanical, or another form.

The units described as separate components may or may not be physically separate, and components displayed as units may or may not be physical units. To be specific, the components may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. An inverter apparatus, wherein the inverter apparatus comprises an inverter circuit and a control unit, the inverter circuit is configured to convert a direct current into two or more levels, and the control unit is configured to:
   obtain an output voltage and an output current of the inverter circuit, wherein the output voltage comprises an output voltage direction and an output voltage amplitude, and the output current comprises an output current direction and an output current amplitude;
   detect, based on the output voltage direction and the output current direction, whether output power of the inverter circuit is active power or reactive power; and
   when the output current amplitude of the reactive power is greater than a current threshold and the detecting detects that the inverter circuit outputs reactive power, control the inverter circuit in a full-bridge two-level bipolar control mode; or
   when the detecting detects that the inverter circuit outputs active power, or when the inverter circuit outputs reactive power and the output current amplitude is not greater than a current threshold, control the inverter circuit in a three-level control mode.

2. The inverter apparatus according to claim 1, wherein the inverter circuit comprises a first vertical bridge arm, a second vertical bridge arm, a first horizontal bridge arm, and a second horizontal bridge arm;
   the first vertical bridge arm comprises a first switching element and a second switching element, a first end of the first switching element is connected to a positive terminal of a first direct current voltage source, a second end of the first switching element is connected to a first output terminal of the inverter circuit, a first end of the second switching element is connected to the first output terminal of the inverter circuit, and a second end of the second switching element is connected to a negative terminal of a second direct current voltage source; and
   the second vertical bridge arm comprises a third switching element and a fourth switching element, a first end of the third switching element is connected to the positive terminal of the first direct current voltage source, a second end of the third switching element is connected to a second output terminal of the inverter circuit, a first end of the fourth switching element is connected to the second output terminal of the inverter circuit, and a second end of the fourth switching element is connected to the negative terminal of the second direct current voltage source.

3. The inverter apparatus according to claim 1, wherein a negative terminal of the first direct current voltage source is connected to a voltage reference point, and a positive terminal of the second direct current voltage source is connected to the voltage reference point;
   the first horizontal bridge arm comprises a fifth switching element and a sixth switching element, a first end of the fifth switching element is connected to the first output terminal of the inverter circuit, a first end of the sixth switching element is connected to the voltage reference point, and a second end of the fifth switching element is connected to a second end of the sixth switching element; and
   the second horizontal bridge arm comprises a seventh switching element and an eighth switching element, a first end of the seventh switching element is connected to the second output terminal of the inverter circuit, a first end of the eighth switching element is connected to the voltage reference point, and a second end of the seventh switching element is connected to a second end of the eighth switching element.

4. The inverter apparatus according to claim 3, wherein the control unit is configured to:
   control the inverter circuit to drive each of the first switching element to the fourth switching element, and not to drive each of the fifth switching element to the eighth switching element.

5. The inverter apparatus according to claim 3, wherein the first switching element to the eighth switching element each comprises one or more semiconductor devices.

6. The inverter apparatus according to claim 5, wherein any one of the fifth switching element to the eighth switching element comprises two or more semiconductor devices.

7. The inverter apparatus according to claim 1, wherein the inverter circuit comprises a first vertical bridge arm, a second vertical bridge arm, and a first horizontal bridge arm;
the first vertical bridge arm comprises a first switching element and a second switching element, a first end of the first switching element is connected to a positive terminal of a direct current voltage source, a second end of the first switching element is connected to a first output terminal of the inverter circuit, a first end of the second switching element is connected to the first output terminal of the inverter circuit, and a second end of the second switching element is connected to a negative terminal of the direct current voltage source; and
the second vertical bridge arm comprises a third switching element and a fourth switching element, a first end of the third switching element is connected to the positive terminal of the direct current voltage source, a second end of the third switching element is connected to a second output terminal of the inverter circuit, a first end of the fourth switching element is connected to the second output terminal of the inverter circuit, and a second end of the fourth switching element is connected to the negative terminal of the direct current voltage source.

8. The inverter apparatus according to claim 7, wherein the first horizontal bridge arm comprises a fifth switching element and a sixth switching element, a first end of the fifth switching element is connected to the first output terminal of the inverter circuit, a first end of the sixth switching element is connected to the second output terminal of the inverter circuit, and a second end of the fifth switching element is connected to a second end of the sixth switching element.

9. The inverter apparatus according to claim 8, wherein the control unit is configured to:
control the inverter circuit to drive each of the first switching element to the fourth switching element, and not to drive each of the fifth switching element and the sixth switching element.

10. The inverter apparatus according to claim 8, wherein each of the first switching element to the sixth switching element each comprises one or more semiconductor devices.

11. The inverter apparatus according to claim 8, wherein the fifth switching element or the sixth switching element comprises two or more semiconductor devices.

12. The inverter apparatus according to claim 8, wherein each of the semiconductor devices comprises an insulated gate bipolar transistor (IGBT) and an anti-parallel diode of the IGBT, and/or a metal-oxide-semiconductor field-effect transistor (MOSFET).

13. An inverter apparatus, wherein the inverter apparatus comprises an inverter circuit and a control unit, the inverter circuit is configured to convert a direct current into two or more levels, and the control unit is configured to:
obtain an output voltage and an output current of the inverter circuit, wherein the output voltage comprises an output voltage direction and an output voltage amplitude, and the output current comprises an output current direction and an output current amplitude;
detect, based on the output voltage direction and the output current direction, whether output power of the inverter circuit is active power or reactive power; and
when the output current amplitude is greater than a current threshold and the detecting detects that the inverter circuit outputs reactive power, control the inverter circuit in a full-bridge two-level bipolar control mode;
when the detecting detects that the inverter circuit outputs active power and the output voltage amplitude is less than a voltage threshold, or when the inverter circuit outputs reactive power, the output current amplitude is not greater than a current threshold, and the output voltage amplitude is less than a voltage threshold, control the inverter circuit in a half-bridge two-level control mode; or
when the output voltage amplitude is not less than a voltage threshold and the detecting detects that the inverter circuit outputs active power and, or when the detecting detects that the inverter circuit outputs reactive power, the output current amplitude is not greater than a current threshold, and the output voltage amplitude is not less than a voltage threshold, control the inverter circuit in a three-level control mode.

14. The inverter apparatus according to claim 13, wherein the inverter circuit comprises a first vertical bridge arm, a second vertical bridge arm, a first horizontal bridge arm, and a second horizontal bridge arm;
the first vertical bridge arm comprises a first switching element and a second switching element, a first end of the first switching element is connected to a positive terminal of a first direct current voltage source, a second end of the first switching element is connected to a first output terminal of the inverter circuit, a first end of the second switching element is connected to the first output terminal of the inverter circuit, and a second end of the second switching element is connected to a negative terminal of a second direct current voltage source;
the second vertical bridge arm comprises a third switching element and a fourth switching element, a first end of the third switching element is connected to the positive terminal of the first direct current voltage source, a second end of the third switching element is connected to a second output terminal of the inverter circuit, a first end of the fourth switching element is connected to the second output terminal of the inverter circuit, and a second end of the fourth switching element is connected to the negative terminal of the second direct current voltage source;
a negative terminal of the first direct current voltage source is connected to a voltage reference point, and a positive terminal of the second direct current voltage source is connected to the voltage reference point;
the first horizontal bridge arm comprises a fifth switching element and a sixth switching element, a first end of the fifth switching element is connected to the first output terminal of the inverter circuit, a first end of the sixth switching element is connected to the voltage reference point, and a second end of the fifth switching element is connected to a second end of the sixth switching element; and
the second horizontal bridge arm comprises a seventh switching element and an eighth switching element, a first end of the seventh switching element is connected to the second output terminal of the inverter circuit, a first end of the eighth switching element is connected to the voltage reference point, and a second end of the seventh switching element is connected to a second end of the eighth switching element.

15. The inverter apparatus according to claim 14, wherein the control unit is configured to:
control the inverter circuit to drive each of the first switching element to the fourth switching element, and not to drive each of the fifth switching element to the eighth switching element.

16. The inverter apparatus according to claim 14, wherein the control unit is configured to perform any one of the following:
(1) controlling the inverter circuit to drive the first switching element and the fifth switching element, drive each of the sixth switching element to the eighth switching element to keep closed, and not to drive each of the second switching element to the fourth switching element;
(2) controlling the inverter circuit to drive the fourth switching element and the eighth switching element, drive each of the fifth switching element to the seventh switching element to keep closed, and not to drive each of the first switching element to the third switching element;
(3) controlling the inverter circuit to drive the third switching element and the seventh switching element, drive the fifth switching element, the sixth switching element, and the eighth switching element to keep closed, and not to drive the first switching element, the second switching element, and the fourth switching element; and
(4) controlling the inverter circuit to drive the second switching element and the sixth switching element, drive the fifth switching element, the seventh switching element, and the eighth switching element to keep closed, and not to drive the first switching element, the third switching element, and the fourth switching element.

17. The inverter apparatus according to claim 14, wherein each of the first switching element to the eighth switching element comprises one or more semiconductor devices.

18. The inverter apparatus according to claim 17, wherein any one of the fifth switching element to the eighth switching element comprises two or more semiconductor devices, and wherein the semiconductor device comprises an insulated gate bipolar transistor (IGBT) and an anti-parallel diode of the IGBT, and/or a metal-oxide-semiconductor field-effect transistor (MOSFET).

19. An inverter apparatus control method performed by an inverter apparatus, and the method comprises:
obtaining an output voltage and an output current of an inverter circuit of the inverter apparatus, wherein the output voltage comprises an output voltage direction and an output voltage amplitude, and the output current comprises an output current direction and an output current amplitude;
detecting, based on the output voltage direction and the output current direction, whether output power of the inverter circuit is active power or reactive power; and
when the output current amplitude is greater than a current threshold and the detecting detects that the inverter circuit outputs reactive power, controlling the inverter circuit in a full-bridge two-level bipolar control mode; or
when the detecting detects that the inverter circuit outputs active power, or when the inverter circuit outputs reactive power and the output current amplitude is not greater than a current threshold, controlling the inverter circuit in a three-level control mode.

* * * * *